(12) United States Patent
Kim

(10) Patent No.: US 12,509,051 B2
(45) Date of Patent: Dec. 30, 2025

(54) ELECTRIC BRAKE SYSTEM AND METHOD OF CONTROLLING THE SAME

(71) Applicant: HL MANDO CORPORATION, Gyeonggi-do (KR)

(72) Inventor: Jinseok Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 483 days.

(21) Appl. No.: 18/119,824

(22) Filed: Mar. 10, 2023

(65) Prior Publication Data

US 2023/0286488 A1    Sep. 14, 2023

(30) Foreign Application Priority Data

Mar. 10, 2022 (KR) .................. 10-2022-0030149

(51) Int. Cl.
| | | |
|---|---|---|
| *B60T 13/74* | (2006.01) | |
| *B60T 13/68* | (2006.01) | |
| *B60T 17/22* | (2006.01) | |

(52) U.S. Cl.
CPC .......... *B60T 17/222* (2013.01); *B60T 13/686* (2013.01); *B60T 13/745* (2013.01); *B60T 2220/04* (2013.01); *B60T 2270/406* (2013.01)

(58) Field of Classification Search
CPC .... B60T 13/745; B60T 13/686; B60T 8/3275; B60T 2201/03; B60T 2270/406
See application file for complete search history.

(56) References Cited

U.S. PATENT DOCUMENTS

| | | | |
|---|---|---|---|
| 10,836,368 B2* | 11/2020 | Kim | ................. B60T 8/4086 |
| 11,724,680 B2* | 8/2023 | Kim | ................. B60T 7/042 303/3 |

(Continued)

FOREIGN PATENT DOCUMENTS

| | | |
|---|---|---|
| JP | 2008-221995 | 9/2008 |
| JP | 2016-002969 | 1/2016 |

(Continued)

*Primary Examiner* — Bradley T King
(74) *Attorney, Agent, or Firm* — WOMBLE BOND DICKINSON (US) LLP

(57) ABSTRACT

Disclosed herein is an electric brake system including a reservoir in which a pressurizing medium is stored, an integrated master cylinder including a master piston connected to a brake pedal and a master chamber having a volume changed by a displacement of the master piston, a hydraulic pressure supply device including a first pressure chamber provided in front of a hydraulic piston and a second pressure chamber provided behind the hydraulic piston and configured to move the hydraulic piston forward or backward to generate a hydraulic pressure, first and second hydraulic circuits configured to control a flow of the pressurizing medium supplied to a wheel cylinder, a hydraulic pressure control unit configured to control the flow of the pressurizing medium provided from the hydraulic pressure supply device to the first and second hydraulic circuits, a connection flow path connecting the master chamber and the second pressure chamber, a control valve provided on the connection flow path to control the flow of the pressurizing medium, and a controller electrically connected to the control valve, wherein the controller is configured to open the control valve to supply the pressurizing medium from the master chamber to the second pressure chamber in response to a sudden braking request by a driver.

17 Claims, 8 Drawing Sheets

(56) References Cited

U.S. PATENT DOCUMENTS

| | | | |
|---|---|---|---|
| 11,938,914 B2* | 3/2024 | Yoo | B60T 8/1766 |
| 11,951,955 B2* | 4/2024 | Kim | B60T 13/745 |
| 2022/0396250 A1* | 12/2022 | Ryu | B60T 13/745 |
| 2023/0001901 A1* | 1/2023 | Seol | B60T 8/94 |

FOREIGN PATENT DOCUMENTS

| | | | |
|---|---|---|---|
| KR | 10-2019-0118235 | 10/2019 | |
| WO | WO-2021194286 A1 * | 9/2021 | B60T 13/686 |

\* cited by examiner

ELECTRIC BRAKE SYSTEM AND METHOD OF CONTROLLING THE SAME

CROSS-REFERENCE TO RELATED APPLICATION

This application claims the benefit of Korean Patent Application No. 10-2022-0030149, filed on Mar. 10, 2022 in the Korean Intellectual Property Office, the disclosure of which is incorporated herein by reference.

BACKGROUND

1. Field

Embodiments of the present disclosure relate to an electric brake system and a method of controlling the same, which generate a braking force using an electrical signal corresponding to a displacement of a brake pedal.

2. Description of the Related Art

As part of preparations for continuous demand for eco-friendliness and safety, sudden braking, and autonomous traveling, a brake-by-wire system for electricalizing mechanical connection between a master cylinder, a booster, an anti-lock brake system (ABS), and an electric stability control (ESC) device by replacing the mechanical connection with electrical and electronic connection is being developed. In particular, an integrated electric brake system for generating a braking force using a hydraulic supply device for generating a hydraulic pressure necessary for braking by receiving an electrical signal for a driver's brake pedal operation amount to operate a motor and move a piston in a pressure chamber is being applied.

Such an electric brake system requires a large-capacity motor and consumes a high current because it needs to quickly generate a high hydraulic pressure when a driver suddenly brakes.

SUMMARY

Therefore, it is an aspect of the present disclosure to provide an electric brake system and a method of controlling the same capable of simply and quickly generating a hydraulic pressure required for braking when a driver requests sudden braking.

Additional aspects of the disclosure will be set forth in part in the description which follows and, in part, will be obvious from the description, or may be learned by practice of the disclosure.

In accordance with one aspect of the present disclosure, an electric brake system includes a reservoir in which a pressurizing medium is stored, an integrated master cylinder including a master piston connected to a brake pedal and a master chamber having a volume changed by a displacement of the master piston, a hydraulic pressure supply device including a first pressure chamber provided in front of a hydraulic piston and a second pressure chamber provided behind the hydraulic piston and configured to move the hydraulic piston forward or backward to generate a hydraulic pressure, first and second hydraulic circuits configured to control a flow of the pressurizing medium supplied to a wheel cylinder, a hydraulic pressure control unit configured to control the flow of the pressurizing medium provided from the hydraulic pressure supply device to the first and second hydraulic circuits, a connection flow path connecting the master chamber and the second pressure chamber, a control valve provided on the connection flow path to control the flow of the pressurizing medium, and a controller electrically connected to the control valve. The controller may open the control valve to supply the pressurizing medium from the master chamber to the second pressure chamber in response to a sudden braking request by a driver.

The integrated master cylinder may include a first master piston connected to the brake pedal, a first master chamber having a volume changed by a displacement of the first master piston, a second master piston provided to be displaced by the displacement of the first master piston, and a second master chamber having a volume changed by a displacement of the second master piston.

The electric brake system may further include a dump flow path connecting the second pressure chamber and the reservoir, and a dump valve provided on the dump flow path to control the flow of the pressurizing medium, wherein the connection flow path may have one end connected to the dump flow path and the other end connected to the first master chamber, and the control valve may be provided at one end of the connection flow path.

The controller may close the dump valve to supply the pressurizing medium from the first master chamber to the second pressure chamber.

The electric brake system may further include a pressure sensor configured to detect a circuit pressure of the first hydraulic circuit or the second hydraulic circuit. The controller is configured to close the control valve and open the dump valve, based on a circuit pressure detected through the pressure sensor being higher than a preset pressure.

The controller may perform a first test mode and a second test mode in which whether leakage occurs in a simulator valve configured to control the flow of the pressurizing medium between the reservoir and the first master chamber or the integrated master cylinder is inspected.

The controller may close the control valve and open the dump valve in the first test mode. The controller may open the control valve and close the dump valve in the second test mode.

The connection flow path may directly connect the first master chamber and the second pressure chamber.

The electric brake system may further include a brake pedal sensor configured to detect a displacement of the brake pedal. The controller may open the control valve based on a displacement of the brake pedal reaching a preset value.

In accordance with another aspect of the present disclosure, a method of controlling an electric brake system including a reservoir in which a pressurizing medium is stored, an integrated master cylinder including a master piston connected to a brake pedal and a master chamber having a volume changed by a displacement of the master piston, a hydraulic pressure supply device including a first pressure chamber provided in front of a hydraulic piston and a second pressure chamber provided behind the hydraulic piston and configured to move the hydraulic piston forward or backward to generate a hydraulic pressure, first and second hydraulic circuits configured to control a flow of the pressurizing medium supplied to a wheel cylinder, a hydraulic pressure control unit configured to control the flow of the pressurizing medium provided from the hydraulic pressure supply device to the first and second hydraulic circuits, a connection flow path connecting the master chamber and the second pressure chamber, and a control valve provided on the connection flow path to control the flow of the pressurizing medium, includes opening the control valve to supply the pressurizing medium from the master chamber to the second pressure chamber in response to a sudden braking request by a driver.

The integrated master cylinder may include a first master piston connected to the brake pedal, a first master chamber having a volume changed by a displacement of the first master piston, a second master piston provided to be displaced by the displacement of the first master piston, and a second master chamber having a volume changed by a displacement of the second master piston.

The electric brake system may further include a dump flow path connecting the second pressure chamber and the reservoir, and a dump valve provided on the dump flow path to control the flow of the pressurizing medium. The connection flow path may have one end connected to the dump flow path and the other end connected to the first master chamber. The control valve may be provided at one end of the connection flow path.

The opening of the control valve may include closing the dump valve to supply the pressurizing medium from the first master chamber to the second pressure chamber.

The method may further include after the opening of the control valve, closing the control valve and opening the dump valve, based on a circuit pressure detected through a pressure sensor configured to detect a circuit pressure of the first hydraulic circuit or the second hydraulic circuit being higher than a preset pressure.

The method may further include performing a first test mode and a second test mode in which whether leakage occurs in a simulator valve configured to control the flow of the pressurizing medium between the reservoir and the first master chamber or the integrated master cylinder is inspected.

The performing of the first test mode may include closing the control valve and opening the dump valve. The performing of the second test mode may include opening the control valve and closing the dump valve.

The opening of the control valve may include opening the control valve based on a displacement of the brake pedal reaching a preset value.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The same reference numbers indicate the same components throughout the specification. The present specification does not describe all elements of embodiments, and general contents or overlapping contents between the embodiments in the technical field to which the disclosure pertains will be omitted. Terms "unit, module, member, and block" used in the specification may be implemented as software or hardware, and according to the embodiments, each of a plurality of "units, modules, members, and blocks" may be implemented as one component or one "unit, module, member, and block" may also include a plurality of components.

Throughout the specification, when a certain portion is described as being "connected" to another, this includes not only a case of being directly connected thereto but also a case of being indirectly connected thereto, and the indirect connection includes connection through a wireless communication network.

In addition, when a certain portion is described as "including," a certain component, this means further including other components rather than precluding other components unless especially stated otherwise.

Throughout the specification, when a certain member is described as being positioned "on" another, this includes not only a case where the certain member is in contact with another but also a case where other members are present between the two members.

Terms such as first and second are used to distinguish one component from another, and the components are not limited by the above-described terms. A singular expression includes plural expressions unless the context clearly dictates otherwise.

In each operation, identification symbols are used for convenience of description, and the identification symbols do not describe the sequence of each operation, and each operation may be performed in a different sequence from the specified sequence unless a specific sequence is clearly described in context.

Figure 1:
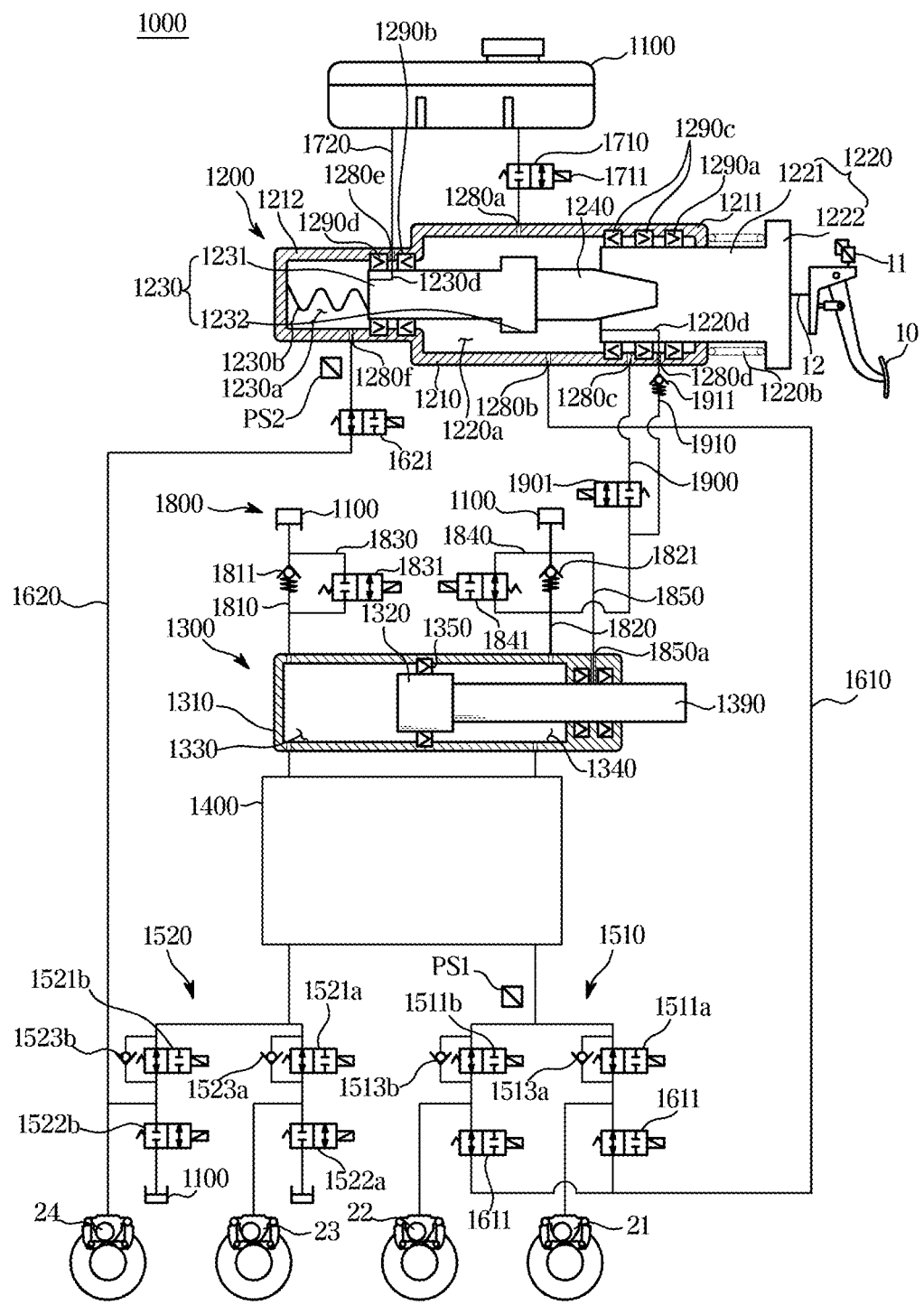
FIG. 1 is a hydraulic circuit diagram showing an electric brake system according to a first embodiment.
Figure 2:
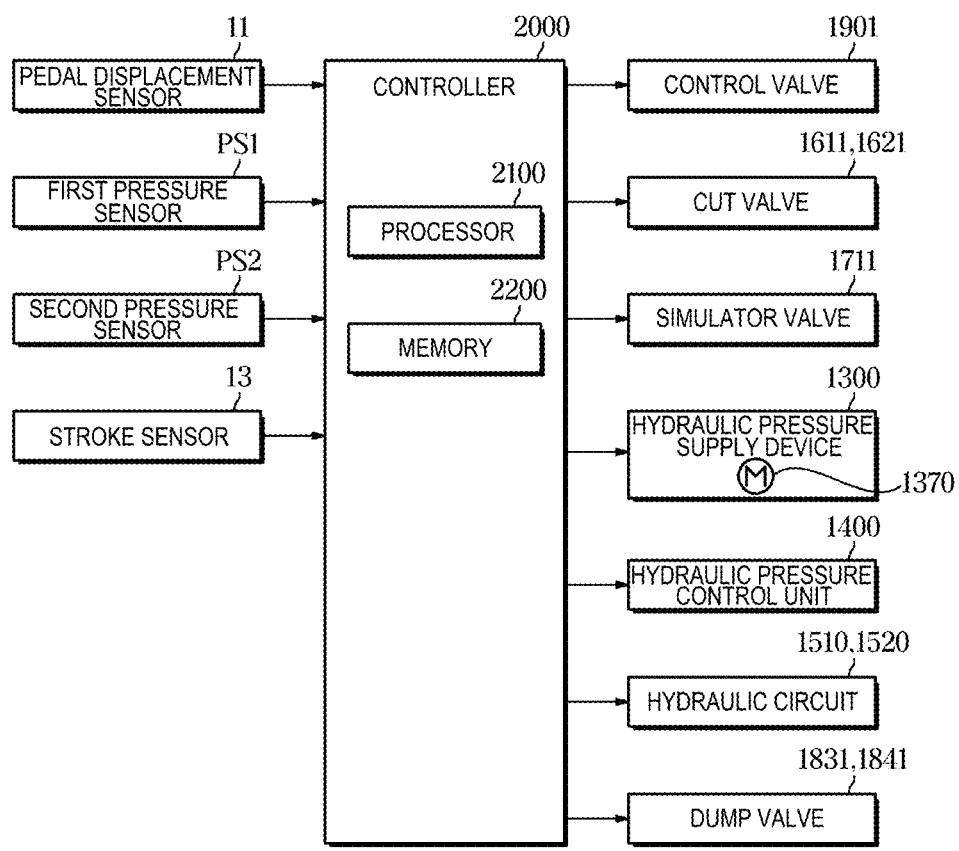
FIG. 2 is a control block diagram of the electric brake system according to the first embodiment.

FIG. 1 is a hydraulic circuit diagram showing an electric brake system according to a first embodiment, and FIG. 2 is a control block diagram of the electric brake system according to the first embodiment.

Referring to FIGS. 1 and 2, an electric brake system 1000 according to the first embodiment includes a reservoir 1100 in which a pressuring medium is stored, an integrated master cylinder 1200 for providing a reaction force according to a pedal force of a brake pedal 10 to a driver and at the same time, pressurizing and discharging the pressurizing medium, such as brake oil, accommodated inside thereof, a hydraulic pressure supply device 1300 for receiving the driver's braking intention as an electrical signal by a pedal displacement sensor 11 for detecting a displacement of the brake pedal 10 to generate a hydraulic pressure of the pressurizing medium through a mechanical operation, a hydraulic pressure control unit 1400 for controlling the hydraulic pressure of the pressurizing medium provided from the hydraulic pressure supply device 1300, hydraulic circuits 1510 and 1520 for controlling a flow of the pressurizing medium provided from the hydraulic pressure control unit 1400 to wheels RR, RL, FR, and FL, a dump control unit 1800 provided between the hydraulic pressure supply device 1300 and the reservoir 1100 to control the flow of the pressurizing medium, backup flow paths 1610 and 1620 hydraulically connecting the integrated master cylinder 1200 and the hydraulic circuits 1510 and 1520, a reservoir flow path 1700 hydraulically connecting the reservoir 1100 and the integrated master cylinder 1200, a connection flow path 1900 connected to a master chamber of the integrated master cylinder 1200, a control valve 1901 provided on the connection flow path 1900 to control the flow of the pressurizing medium, and a controller (electronic control unit (ECU)) 2000 for controlling the hydraulic pressure supply device 1300, the hydraulic pressure control unit 1400, the hydraulic circuits 1510 and 1520, and various valves including the control valve 1901 based on hydraulic information and/or pedal displacement information.

The integrated master cylinder 1200 provides a stable pedal feeling by providing a reaction force in response to a pedal force to the driver when the driver applies the pedal force to the brake pedal 10 for an braking operation and at the same time, pressurize and discharge a pressurizing medium accommodated inside the integrated master cylinder 1200 by operation of the brake pedal 10.

The integrated master cylinder 1200 may include a cylinder body 1210 in which a chamber is formed inside thereof, a first master chamber 1220a formed at an inlet side of the cylinder body to which the brake pedal 10 is connected, a first master piston 1220 provided in the first master chamber 1220a, connected to the brake pedal, and provided to be displaced by the operation of the brake pedal 10, a second master chamber 1230a formed inside or in front of (left side based on FIG. 1) the first master chamber 1220a in the cylinder body 1210, a second master piston 1230 provided in the second master chamber 1230a and provided to be displaced by a displacement of the first master piston 1220 or the hydraulic pressure of the pressurizing medium accommodated in the first master chamber 1220a, and a pedal simulator 1240 disposed between the first master piston 1220 and the second master piston 1230 to provide a pedal feeling through an elastic restoring force generated upon compression.

The first master chamber 1220a and the second master chamber 1230a are sequentially formed inward (left side based on FIG. 1) from the brake pedal 10 (right side based on FIG. 1) in the cylinder body 1210 of the integrated master cylinder 1200. In addition, the first master piston 1220 and the second master piston 1230 are respectively provided in the first master chamber 1220a and the second master chamber 1230a to generate a hydraulic pressure to the pressurizing medium accommodated in each chamber or generate a negative pressure in each chamber according to forward and backward movements thereof.

The cylinder body 1210 may include a large-diameter portion 1211 having the first master chamber 1220a formed inside thereof and having a relatively larger inner diameter and a small-diameter portion 1212 having the second master chamber 1230a formed inside thereof and having a relatively smaller inner diameter. The large-diameter portion 1211 and the small-diameter portion 1212 of the cylinder body 1210 may be integrally formed.

The first master chamber 1220a may be formed inside the large-diameter portion 1211, which is the inlet side or a rear side (right side based on FIG. 1) of the cylinder body 1210, and the first master piston 1220 connected to the brake pedal 10 via an input rod 12 may be reciprocatably accommodated in the first master chamber 1220a.

The pressurizing medium may flow into and be discharged from the first master chamber 1220a through a first hydraulic port 1280a, a second hydraulic port 1280b, a third hydraulic port 1280c, and a fourth hydraulic port 1280d. The first hydraulic port 1280a may be connected to a first reservoir flow path 1710 to be described below to allow the pressurizing medium to flow into the first master chamber 1220a from the reservoir 1100 or allow the pressurizing medium accommodated in the first master chamber 1220a to be discharged to the reservoir 1100, and the second hydraulic port 1280b may be connected to the first backup flow path 1610 to be described below to allow the pressurizing medium to be discharged to the first backup flow path 1610 from the first master chamber 1220a or, conversely, allow the pressurizing medium to flow into the first master chamber 1220a from the first backup flow path 1610.

In addition, the first master chamber 1220a is connected to each of the connection flow path 1900 and a branch flow path 1910 to be described below through the third hydraulic port 1280c and the fourth hydraulic port 1280d. The pressurizing medium accommodated in the first master chamber 1220a may be discharged to the connection flow path 1900 and the branch flow path 1910 or the pressurizing medium may flow into the first master chamber 1220a from the connection flow path 1900.

The first master piston 1220 may be provided to be accommodated in the first master chamber 1220a and may move forward (left direction based on FIG. 1) to pressurize the pressurizing medium accommodated in the first master chamber 1220a to generate a hydraulic pressure or move backward (right direction based on FIG. 1) to generate a negative pressure inside the first master chamber 1220a. The first master piston 1220 may include a first body 1221 formed in a cylindrical shape to be in close contact with an inner circumferential surface of the first master chamber 1220a and a first flange 1222 formed to expand radially from a rear end (right end based on FIG. 1) of the first body 1221 and to which the input rod 12 is connected. The first master piston 1220 may be elastically supported by a first piston spring 1220b, and the first piston spring 1220b may be provided to have one end supported by a front surface of the first flange 1222 (left side surface based on FIG. 1) and the other end supported by an outer surface of the cylinder body 1210.

A first cutoff hole 1220d communicating with the first master chamber 1220a and at the same time, communicating with the fourth hydraulic port 1280d and the branch flow path 1910 in an non-operating state, that is, in a standby state before a displacement occurs, is provided in the first master piston 1220. In addition, a first sealing member 1290a for sealing the first master chamber 1220a from the outside may be provided between an outer circumferential surface of the first master piston 1220 and the cylinder body 1210. The first sealing member 1290a may be seated in an accommodating groove formed to be recessed in the inner circumferential surface of the cylinder body 1210 and provided in contact with the outer circumferential surface of the first master piston 1220, and the first sealing member 1290a can prevent the pressurizing medium accommodated in the first master chamber 1220a from leaking to the outside and at the same time, prevent external foreign substances from being introduced into the first master chamber 1220a. The first sealing member 1290a may be provided at an outermost side of the inner circumferential surface of the cylinder body 1210, that is, a rear side (right side based on FIG. 1) of the fourth hydraulic port 1280d to which the branch flow path 1910 to be described below is connected.

A third sealing member 1290c for blocking the flow of the pressurizing medium introduced into the first master chamber 1220a from the connection flow path 1900 connected to the third hydraulic port 1280c may be provided between the outer circumferential surface of the first master piston 1220 and the cylinder body 1210. The third sealing member 1290c may be seated in a pair of accommodating grooves formed to be recessed in front and behind the third hydraulic port 1280c on the inner circumferential surface of the cylinder body 1210 to be in contact with the outer circumferential surface of the first master piston 1220. The pair of third sealing members 1290c may be provided in front (left side based on FIG. 1) of the first sealing member 1290a and may allow the flow of the pressurizing medium accommodated in the first master chamber 1220a transmitted to the connection flow path 1900 through the third hydraulic port 1280c and block the pressurizing medium introduced into the first master chamber 1220a from flowing to the connection flow path 1900.

The second master chamber 1230a may be formed inside the small-diameter portion 1212, which is inside or a front side (left side based on FIG. 1) of the cylinder body 1210, and the second master piston 1230 may be reciprocatably accommodated in the second master chamber 1230a.

The pressurizing medium may flow into and be discharged from the second master chamber 1230a through a fifth hydraulic port 1280e and a sixth hydraulic port 1280f. The fifth hydraulic port 1280e may be connected to a second reservoir flow path 1720 to be described below to allow the pressurizing medium accommodated in the reservoir 1100 to flow into the second master chamber 1230a. In addition, the sixth hydraulic port 1280f may be connected to a second backup flow path 1620 to be described below to allow the pressurizing medium accommodated in the second master chamber 1230a to be discharged to the second backup flow path 1620 and conversely, allow the pressurizing medium to flow into the second master chamber 1230a from the second backup flow path 1620.

The second master piston 1230 may be provided to be accommodated in the second master chamber 1230a and may move forward to generate a hydraulic pressure of the pressurizing medium accommodated in the second master chamber 1230a and move backward to generate a negative pressure inside the second master chamber 1230a. The second master piston 1230 may include a second body 1231 formed in a cylindrical shape to be in close contact with an inner circumferential surface of the second master chamber 1230a and a second flange 1232 formed to expand radially from a rear end (right end based on FIG. 1) of the second body 1231 and disposed inside the first master chamber 1220a. The second flange 1232 may have a larger diameter than an inner circumferential diameter of the second master chamber 1230a. The second master piston 1230 may be elastically supported by a second piston spring 1230b, and the second piston spring 1230b may be provided to have one end supported by a front surface (left side surface based on FIG. 1) of the second body 1231 and the other end supported by an inner surface of the cylinder body 1210.

A second sealing member 1290b for sealing the first master chamber 1220a from the second master chamber 1230a may be provided between an outer circumferential surface of the second master piston 1230 and the cylinder body 1210. The second sealing member 1290b may be seated in an accommodating groove formed to be recessed in the inner circumferential surface of the cylinder body 1210 and provided in contact with the outer circumferential surface of the second master piston 1230, and the second sealing member 1290b can prevent the pressurizing medium accommodated in the first master chamber 1220a from leaking to the second master chamber 1230a.

A second cutoff hole 1230d communicating with the second master chamber 1230a and at the same time, communicating with the fifth hydraulic port 1280e and the second reservoir flow path 1720 in a non-operating state, that is, in a standby state before a displacement occurs, is provided in the second master piston 1230. In addition, a fourth sealing member 1290d for blocking the pressurizing medium discharged to the second reservoir flow path 1720 connected to the fifth hydraulic port 1280e from flowing to the second master chamber 1230a may be provided between the outer circumferential surface of the second master piston 1230 and the cylinder body 1210. The fourth sealing member 1290d may be seated in an accommodating groove formed to be recessed in front (left side based on FIG. 1) of the fifth hydraulic port 1280e on the inner circumferential surface of the cylinder body 1210 to be in contact with the outer circumferential surface of the second master piston 1230. The fourth sealing member 1290d may be provided in front (left side based on FIG. 1) of the second sealing member 1290b to allow the flow of the pressurizing medium transmitted to the second master chamber 1230a from the second reservoir flow path 1720 connected to the fifth hydraulic port 1280e and block the flow of the pressurizing medium transmitted to the fifth hydraulic port 1280e and the second reservoir flow path 1720 from the second master chamber 1230a.

The integrated master cylinder 1200 may be independently provided with each of the first master chamber 1220a and the second master chamber 1230a, thereby securing safety upon failure of components. For example, the first master chamber 1220a may be connected to any two wheel cylinders 21 and 22 of a front right wheel FR, a front left wheel FL, a rear left wheel RL, and a rear left wheel RR through the first backup flow path 1610 to be described below, and the second master chamber 1230a may be connected to the remaining two wheel cylinders 23 and 24 through the second backup flow path 1620 to be described below, and thus the braking of a vehicle is possible even when a problem, such as leak, occurs in any one chamber.

The pedal simulator 1240 may be provided between the first master piston 1220 and the second master piston 1230 and provide a pedal feeling of the brake pedal 10 to the driver by an elastic restoring force thereof. Specifically, the pedal simulator 1240 may be interposed between a front surface of the first master piston 1220 and a rear surface of the second master piston 1230 and may be made of an elastic material, such as compressible and expandable rubber. The pedal simulator 1240 may include a cylindrical body portion 1241 whose at least part is inserted into and supported by the front surface of the first master piston 1220 and a tapered portion 1242 whose at least a part is inserted into and supported by the rear surface of the second master piston 1230 and formed to have a diameter that gradually increases in a forward direction (left side based on FIG. 1). At least a part of both ends of the pedal simulator 1240 may be inserted into and thus stably supported by the first master piston 1220. Furthermore, by changing the elastic restoring force according to a degree of the pedal force of the brake pedal 10 by the tapered portion 1242, it is possible to provide a stable and familiar pedal feeling to the driver.

A simulator valve 1711 may be provided on the first reservoir flow path 1710 to be described below to control the flow of the pressurizing medium between the reservoir 1100 and the first master chamber 1220a. The simulator valve 1711 may be provided as a normal closed type solenoid valve that is normally closed and operates so that the valve is opened when receiving an electrical signal from the controller 2000 and opened in a normal operation mode of the electric brake system 1000.

Describing a pedal simulation operation by the integrated master cylinder 1200, when the driver operates the brake pedal 10 in the normal operation mode, at the same time, a first cut valve 1611 and a second cut valve 1621 respectively provided on the first backup flow path 1610 and the second backup flow path 1620, which will be described below, are closed, while the simulator valve 1711 of the first reservoir flow path 1710 is opened. As the operation of the brake pedal 10 proceeds, the first master piston 1220 moves forward, but as the second cut valve 1621 is closed, the second master chamber 1230a is sealed and thus a displacement of the second master piston 1230 may not occur. At this time, the pressurizing medium accommodated in the first master chamber 1220a is introduced along the first reservoir flow path 1710 by the closing operation of the first cut valve 1611 and the opening operation of the simulator valve 1711. The second master piston 1230 may not move forward, while the first master piston 1220 may compress the pedal simulator 1240 as it continues to move forward, and the elastic restoring force of the pedal simulator 1240 may be provided to the driver as a pedal feeling. Then, when the driver releases the pedal force of the brake pedal 10, the first and second master pistons 1220 and 1230 and the pedal simulator 1240 may return to their original shapes and positions by the elastic restoring force of the first and second piston springs 1220b and 1230b and the pedal simulator 1240, and the first master chamber 1220a may be filled with the pressurizing medium supplied from the reservoir 1100 through the first reservoir flow path 1710.

As described above, since the insides of the first master chamber 1220a and the second master chamber 1230a are always filled with the pressurizing medium, when pedal simulation operates, it is possible to minimize friction between the first master piston 1220 and the second master piston 1230 so as to not only increase the durability of the integrated master cylinder 1200 but also block foreign substances from being introduced from the outside.

The reservoir 1100 may accommodate and store the pressurizing medium inside thereof. The reservoir 1100 may be connected to various components, such as the integrated master cylinder 1200, the hydraulic pressure supply device 1300 to be described below, and the hydraulic circuit to be described below to supply or receive the pressurizing medium. In the drawings, several reservoirs 1100 are shown with the same reference numerals, but this is an example for helping understanding of the disclosure, and the reservoir 1100 may be provided as a single component or provided as a plurality of separate and independent components.

The reservoir flow path 1700 is provided to connect the integrated master cylinder 1200 and the reservoir 1100.

The reservoir flow path 1700 may include the first reservoir flow path 1710 connecting the first master chamber 1220a and the reservoir 1100 and the second reservoir flow path 1720 connecting the second master chamber 1230a and the reservoir 1100. To this end, the first reservoir flow path 1710 may have one end communicating with the first master chamber 1220a by the first hydraulic port 1280a of the integrated master cylinder 1200 and the other end communicating with the reservoir 1100, and the second reservoir flow path 1720 may have one end communicating with the second master chamber 1230a by the fifth hydraulic port 1280e of the integrated master cylinder 1200 and the other end communicating with the reservoir 1100. In addition, as described above, the first reservoir flow path 1710 may be provided with the simulator valve 1711 that is opened in the normal operation mode to control the flow of the pressurizing medium between the reservoir 1100 and the first master chamber 1220a through the first reservoir flow path 1710.

The hydraulic pressure supply device 1300 is provided to receive the driver's braking intention as the electrical signal from the pedal displacement sensor 11 for detecting the displacement of the brake pedal 10 and generate the hydraulic pressure of the pressurizing medium through the mechanical operation.

The hydraulic pressure supply device 1300 may include a hydraulic pressure provision unit for providing the pressure of the pressurizing medium transmitted to the wheel cylinder 20, a motor 1370 (M) for generating a rotating force by the electrical signal of the pedal displacement sensor 11, a power converter (not shown) for converting a rotating motion of the motor 1370 into a linear motion and transmitting the linear motion to the hydraulic pressure provision unit.

The hydraulic pressure provision unit includes a cylinder block 1310 provided to accommodate the pressuring medium, a hydraulic piston 1320 accommodated in the cylinder block 1310, a sealing member 1350 provided between the hydraulic piston 1320 and the cylinder block 1310 to seal pressure chambers 1330 and 1340, and a driving shaft 1390 for transmitting power output from the power converter to the hydraulic piston 1320.

The pressure chambers 1330 and 1340 may include the first pressure chamber 1330 positioned in front (left direction of the hydraulic piston 1320 based on FIG. 1) of the hydraulic piston 1320 and the second pressure chamber 1340 positioned behind (right direction of the hydraulic piston 1320 based on FIG. 1) the hydraulic piston 1320. In other words, the first pressure chamber 1330 is provided to be partitioned by the cylinder block 1310 and a front surface of the hydraulic piston 1320 and provided so that a volume varies depending on the movement of the hydraulic piston 1320, and the second pressure chamber 1340 is provided to be partitioned by the cylinder block 1310 and a rear surface of the hydraulic piston 1320 and provided so that a volume varies depending on the movement of the hydraulic piston 1320.

The motor 1370 is provided to generate a driving force of the hydraulic piston 1320 by an electrical signal output from the controller 2000. The motor 1370 may include a stator and a rotor and thus rotate in a forward direction or a reverse direction to provide power for generating a displacement of the hydraulic piston 1320. A rotating angular velocity and a rotating angle of the motor 1370 may be precisely controlled by a motor control sensor (not shown), and the motor control sensor may control operations of the motor 1370 and the hydraulic piston 1320 based on a hydraulic pressure value detected by a first pressure sensor PS1 to be described below. Since the motor 1370 is a well-known technology, a detailed description thereof will be omitted.

The power converter (not shown) is provided to convert the rotating motion of the motor 1370 into the linear motion. The power converter may be provided in a structure including, for example, a worm shaft (not shown), a worm wheel (not shown), and the driving shaft 1390. The worm shaft may be integrally formed with a rotating shaft of the motor 1370, and a worm may be formed on an outer circumferential surface of the worm shaft and coupled to be engaged with the worm wheel to rotate the worm wheel. The worm wheel may be connected to be engaged with the driving shaft 1390 to linearly move the driving shaft 1390, and the driving shaft 1390 may be connected to the hydraulic piston 1320, and thus the hydraulic piston 1320 may slide in the cylinder block 1310.

Describing the above operations again, when the displacement of the brake pedal 10 is detected by the pedal displacement sensor 11, a detected signal is transmitted to the controller 2000, and the controller 2000 drives the motor 1370 to rotate the worm shaft in one direction. A rotating force of the worm shaft may be transmitted to the driving shaft 1390 via the worm wheel, and the hydraulic piston 1320 connected to the driving shaft 1390 may move forward in the cylinder block 1310 to generate the hydraulic pressure in the first pressure chamber 1330.

Conversely, when the pedal force of the brake pedal 10 is released, the controller 2000 drives the motor 1370 to rotate the worm shaft in a direction opposite to the one direction. Therefore, the worm wheel also rotates in the direction opposite to the one direction, and the hydraulic piston 1320 connected to the driving shaft 1390 may move backward in the cylinder block 1310 to generate a negative pressure in the first pressure chamber 1330.

A hydraulic pressure and a negative pressure in the second pressure chamber 1340 may be generated by an operation in a direction opposite to the above direction. In other words, when the displacement of the brake pedal 10 is detected by the pedal displacement sensor 11, the detected signal is transmitted to the controller 2000, and the controller 2000 drives the motor 1370 to move the worm shaft in the direction opposite the above direction. The rotating force of the worm shaft may be transmitted to the driving shaft 1390 via the worm wheel, and the hydraulic piston 1320 connected to the driving shaft 1390 may move backward in the cylinder block 1310 to generate a hydraulic pressure in the second pressure chamber 1340.

Conversely, when the pedal force of the brake pedal 10 is released, the controller 2000 drives the motor 1370 in the one direction to rotate the worm shaft in the one direction. Therefore, the worm wheel also rotates in the direction the above direction, and the hydraulic piston 1320 connected to the driving shaft 1390 moves forward in the cylinder block 1310 to generate a negative pressure in the second pressure chamber 1340.

As described above, in the hydraulic pressure supply device 1300, the hydraulic pressure or the negative pressure may be generated in each of the first pressure chamber 1330 and the second pressure chamber 1340 according to the rotating direction of the worm shaft by the driving of the motor 1370, and whether to implement the braking by transmitting the hydraulic pressure or whether to release the braking using the negative pressure may be determined by controlling valves.

Meanwhile, the power converter according to the first embodiment of the present disclosure is not limited to any one structure as long as it may convert the rotating motion of the motor 1370 into the linear motion of the hydraulic piston 1320, and a case in which the power converter is formed as a device having various structures and methods should also be understood in the same manner.

The hydraulic pressure supply device 1300 may be hydraulically connected to the reservoir 1100 by the dump control unit 1800. The dump control unit 1800 may include a first dump flow path 1810 connecting the first pressure chamber 1330 and the reservoir 1100, a first bypass flow path 1830 rejoined to the first dump flow path 1810 after branched off from the first dump flow path 1810, a second dump flow path 1820 connecting the second pressure chamber 1340 and the reservoir 1100, a second bypass flow path 1840 rejoined to the second dump flow path 1820 after branched off from the second dump flow path 1820, and an assistance dump flow path 1850 assistantly connecting the first pressure chamber 1330 and the reservoir 1100.

A first dump check valve 1811 and a first dump valve 1831 for controlling the flow of the pressurizing medium may be respectively provided on the first dump flow path 1810 and the first bypass flow path 1830. The first dump check valve 1811 may be provided to allow only the flow of the pressurizing medium in a direction from the reservoir 1100 toward the first pressure chamber 1330 and block the flow of the pressurizing medium in a direction opposite to the above direction. The first bypass flow path 1830 may be connected to the first dump flow path 1810 to be parallel to the first dump check valve 1811, and the first dump valve 1831 for controlling the flow of the pressurizing medium between the first pressure chamber 1330 and the reservoir 1100 may be provided on the first bypass flow path 1830. In other words, the first bypass flow path 1830 may bypass a front end and a rear end of the first dump check valve 1811 on the first dump flow path 1810 and may be connected to the first dump flow path 1810, and the first dump valve 1831 may be provided as a two-way solenoid valve for controlling the flow of the pressurizing medium between the first pressure chamber 1330 and the reservoir 1100. The first dump valve 1831 may be provided as a normal closed type solenoid valve that is normally closed and operates so that the valve is opened when receiving an electrical signal from the controller 2000.

A second dump check valve 1821 and a second dump valve 1841 for controlling the flow of the pressurizing medium may be respectively provided on the second dump flow path 1820 and the second bypass flow path 1840. The second dump check valve 1821 may be provided to allow only the flow of the pressurizing medium in a direction from the reservoir 1100 toward the second pressure chamber 1340 and block the flow of the pressurizing medium in a direction opposite to the above direction. The second bypass flow path 1840 may be connected to the second dump flow path 1820 to be parallel to the second dump check valve, and the second dump valve 1841 for controlling the flow of the pressurizing medium between the second pressure chamber 1340 and the reservoir 1100 may be provided on the second bypass flow path 1840. In other words, the second bypass flow path 1840 may bypass a front end and a rear end of the second dump check valve 1821 on the second dump flow path 1820 and may be connected to the second dump flow path 1820, and the second dump valve 1841 may be provided as a two-way solenoid valve for controlling the flow of the pressurizing medium between the second pressure chamber 1340 and the reservoir 1100. The second dump valve 1841 may be provided as a normal open type solenoid valve that is normally open and operates so that the valve is closed when receiving an electrical signal from the controller 2000.

The assistance dump flow path 1850 may assist communication between the second pressure chamber 1340 and the reservoir 1100 through the assistance hydraulic port 1850a. Specifically, the assistance hydraulic port 1850a may be connected to the assistance dump flow path 1850 to assist the flow of the pressurizing medium between the second pressure chamber 1340 and the reservoir 1100, a sealing member 1350b may be provided in front (left side based on FIG. 1) of the assistance hydraulic port 1850a to allow the supply of the pressurizing medium in a direction from the assistance dump flow path 1850 to the second pressure chamber 1340 and block the flow of the pressurizing medium in a direction opposite to the above direction, and a sealing member 1350*c* may be provided behind (right side based on FIG. 1) the assistance dump flow path 1850 to prevent the pressurizing medium from leaking to the outside from the second pressure chamber 1340.

The hydraulic pressure control unit 1400 may be provided to control the hydraulic pressure transmitted to each wheel cylinder 20, and the controller 2000 may be provided to control the hydraulic pressure supply device 1300 and various valves based on hydraulic information and/or pedal displacement information.

The hydraulic pressure control unit 1400 may include the first hydraulic circuit 1510 for controlling the flow of the pressurizing medium transmitted to the first and second wheel cylinders 21 and 22 among the four wheel cylinders 20 and the second hydraulic circuit 1520 for controlling the flow of the pressurizing medium transmitted to the third and fourth wheel cylinders 23 and 24 and includes a plurality of flow paths and valves to control the hydraulic pressure of the pressurizing medium transmitted to the wheel cylinder 20 from the hydraulic pressure supply device 1300.

The hydraulic pressure control unit 1400 may adjust and control the hydraulic pressure in the first pressure chamber 1330 generated by the forward movement of the hydraulic piston 1320 or the hydraulic pressure in the second pressure chamber 1340 generated by the backward movement of the hydraulic piston 1320 and provide the hydraulic pressure to the first hydraulic circuit 1510 and the second hydraulic circuit 1520. In addition, the hydraulic pressure control unit 1400 may recover the pressurizing medium provided to the first hydraulic circuit 1510 and the second hydraulic circuit 1520 through the negative pressure in the first pressure chamber generated by the backward movement of the hydraulic piston 1320 or the negative pressure in the second pressure chamber 1340 generated by the forward movement of the hydraulic piston 1320.

The first hydraulic circuit 1510 may control the hydraulic pressures applied to the first and second wheel cylinders 21 and 22, which are two wheel cylinders 20 of the four wheels RR, RL, FR, and FL and control the hydraulic pressures applied to the third and fourth wheel cylinders 23 and 24, which are the remaining two wheel cylinders 20.

The first hydraulic circuit 1510 may be provided to be branched off to two flow paths connected to the first wheel cylinder 21 and the second wheel cylinder 22 to supply the hydraulic pressure provided via the hydraulic pressure control unit 1400 from the hydraulic pressure supply device 1300 to the first wheel cylinder 21 and the second wheel cylinder 22. Likewise, the second hydraulic circuit 1520 may be provided to be branched off to two flow paths connected to the third wheel cylinder 23 and the fourth wheel cylinder 24 to supply the hydraulic pressure provided via the hydraulic pressure control unit 1400 from the hydraulic pressure supply device 1300 to the third wheel cylinder 23 and the fourth wheel cylinder 24.

The first and second hydraulic circuits 1510 and 1520 may include first to fourth inlet valves 1511*a*, 1511*b*, 1521*a*, and 1521*b*, respectively, to control the flow and hydraulic pressures of the pressurizing media transmitted to the first to fourth wheel cylinders 21, 22, 23, and 24. The first to fourth inlet valves 1511*a*, 1511*b*, 1521*a*, and 1521*b* may be respectively disposed at upstream sides of the first to fourth wheel cylinders 21, 22, 23, and 24 and provided as a normal open type solenoid valve that is normally open and operates so that the valve is closed when receiving an electrical signal from the controller 2000.

The first inlet valve 1511*a* and the second inlet valve 1511*b* may be controlled to be opened in an test mode to be described below. This requires an expansion of a volume at which the pressurizing medium is accommodated in order to perform precise control of the motor 1370 even in a low target pressure when the hydraulic pressure of the hydraulic pressure supply device 1300 for performing the test mode is generated. Therefore, in a first test mode of the electric brake system 1000, which will be described below, at least any one of the first inlet valve 1511*a* and the second inlet valve 1511*b* may be controlled to be opened to increase the volume of the pressurizing medium provided from the hydraulic pressure supply device 1300. On the other hand, the third inlet valve 1521*a* and the fourth inlet valve 1521*b* may be controlled to be closed in the first test mode to prevent the hydraulic pressure supplied from the hydraulic pressure supply device 1300 from leaking to the second backup flow path 1620, thereby achieving speed and accuracy of the test mode. A detailed description thereof will be described below.

The first and second hydraulic circuits 1510 and 1520 may include first to fourth check valves 1513*a*, 1513*b*, 1523*a*, and 1523*b* provided to be connected in parallel to the first to fourth inlet valves 1511*a*, 1511*b*, 1521*a*, and 1521*b*. The check valves 1513*a*, 1513*b*, 1523*a*, and 1523*b* may be provided on the bypass flow path for connecting front and rear sides of the first to fourth inlet valves 1511*a*, 1511*b*, 1521*a*, and 1521*b* on the first and second hydraulic circuits 1510 and 1520 to allow only the flow of the pressurizing medium from each wheel cylinder 20 to the hydraulic pressure supply device 1300 or the hydraulic pressure control unit 1400 and block the flow of the pressurizing medium from the hydraulic pressure supply device 1300 or the hydraulic pressure control unit 1400 to the wheel cylinder 20. The hydraulic pressure of the pressurizing medium applied to each wheel cylinder 20 may be quickly discharged using the first to fourth check valves 1513*a*, 1513*b*, 1523*a*, and 1523*b*, and even when the first to fourth inlet valves 1511*a*, 1511*b*, 1521*a*, and 1521*b* do not normally operate, the hydraulic pressure of the pressurizing medium applied to the wheel cylinder 20 may be smoothly recovered to the hydraulic pressure supply device 1300.

The second hydraulic circuit 1520 may include first and second outlet valves 1522*a* and 1522*b* for controlling the flow of the pressurizing medium discharged from the third and fourth wheel cylinders 23 and 24 in order to improve performance when the braking of the third and fourth wheel cylinders 23 and 24 is released. The first and second outlet valves 1522*a* and 1522*b* are respectively provided at discharge sides of the third and fourth wheel cylinders 23 and 24 to control the flow of the pressurizing media transmitted to the reservoir 1100 from the third and fourth wheel cylinders 23 and 24. The first and second outlet valves 1522*a* and 1522*b* may be provided as a normal closed type solenoid valve that is normally closed and operates so that the valve is opened when receiving an electrical signal from the controller 2000. The first and second outlet valves 1512*a* and 1512*b* may selectively release the hydraulic pressures of the pressurizing media applied to the third wheel cylinder 23 and the fourth wheel cylinder 22 in an ABS braking mode of a vehicle to transmit the hydraulic pressure to the reservoir 1100.

The first and second wheel cylinders 21 and 22 of the first hydraulic circuit 1510 may be connected to the branched first backup flow path 1610 to be described below, and at least one first cut valve 1611 may be provided on the first backup flow path 1610 to control the flow of the pressurizing medium between the first and second wheel cylinders 21 and 22 and the integrated master cylinder 1200.

The electric brake system 1000 according to the first embodiment may include the first and second backup flow paths 1610 and 1620 to implement braking by directly supplying the pressurizing medium discharged from the integrated master cylinder 1200 to the wheel cylinder 20 when the normal operation is impossible due to a failure of the device or the like. A mode in which the hydraulic pressure of the integrated master cylinder 1200 is directly transmitted to the wheel cylinder 20 is referred to as an abnormal operation mode, that is, a fallback mode.

The first backup flow path 1610 may be provided to connect the first master chamber 1220a of the integrated master cylinder 1200 and the first hydraulic circuit 1510, and the second backup flow path 1620 may be provided to connect the second master chamber 1230a of the integrated master cylinder 1200 and the second hydraulic circuit 1520.

The first backup flow path 1610 may have one end connected to the first master chamber 1220a and the other end branched off and connected to downstream sides of the first and second inlet valves 1511a and 1511b in the first hydraulic circuit 1510, and the second backup flow path 1620 may have one end connected to the second master chamber 1230a and the other end connected between the third inlet valve 1521a and the first outlet valve 1522a in the second hydraulic circuit 1520. Although FIG. 1 shows that the second backup flow path 1620 is connected between the third inlet valve 1521a and the first outlet valve 1522a, it should be understood in the same manner as long as the second backup flow path 1620 is branched off and connected to at least any one of upstream sides of the first outlet valve 1522a and the second outlet valve 1522b.

At least one first cut valve 1611 for controlling the flow of the pressurizing medium in both directions may be provided on the first backup flow path 1610, and the second cut valve 1621 for controlling the flow of the pressurizing medium in both directions may be provided on the second backup flow path 1620. The first cut valve 1611 and the second cut valve 1621 may be provided as a normal open type solenoid valve that is normally open and operates so that the valve is closed when receiving a closing signal from the controller 2000.

As shown in FIG. 1, a pair of first cut valves 1611 may also be provided for the first and second wheel cylinders 21 and 22, respectively, and as will be described below, may selectively release the hydraulic pressures of the pressurizing media applied to the first wheel cylinder 21 and the second wheel cylinder 22 in an test standby mode or the ABS braking mode of the vehicle to discharge the hydraulic pressure to the reservoir 1100 via the first backup flow path 1610, the first master chamber 1220a, the branch flow path 1910 to be described below, a connection flow path 1900, and the second dump flow path 1820. A detailed description thereof will be described below.

When the first and second cut valves 1611 and 1621 are closed, it is possible to prevent the pressurizing medium of the integrated master cylinder 1200 from being directly transmitted to the wheel cylinder 20, and at the same time, prevent the hydraulic pressure provided from the hydraulic pressure supply device 1300 from leaking to the integrated master cylinder 1200. In addition, when the first and second cut valves 1611 and 1621 are opened, the pressurizing medium pressurized in the integrated master cylinder 1200 may be directly supplied to the first and second hydraulic circuits 1510 and 1520 through the first and second backup flow paths 1610 and 1620, thereby implementing the braking.

The connection flow path 1900 is provided to connect the integrated master cylinder 1200 and the dump control unit 1800.

The connection flow path 1900 has one end connected to the first master chamber 1220a of the integrated master cylinder 1200 and the other end connected to the second dump flow path 1820 of the dump control unit 1800. The one end of the connection flow path 1900 may be connected to the first master chamber 1220a of the integrated master cylinder 1200 and connected to the third hydraulic port 1280c. The other end of the connection flow path 1900 may be connected between the second dump check valve 1821 of the second dump flow path 1820 and the second pressure chamber 1340.

The control valve 1901 for controlling the flow of the pressurizing medium may be provided at one end of the connection flow path 1900.

The control valve 1901 may be provided as a normal open type solenoid valve that is normally closed and operates so that the valve is opened when receiving an electrical signal from the controller 2000.

When the control valve 1901 is closed, the connection flow path 1900 is closed, and thus the pressurizing medium from the first master chamber 1220a of the integrated master cylinder 1200 is not supplied to the second pressure chamber 1340 of the hydraulic pressure supply device 1300 via the second dump flow path 1820.

When the control valve 1901 is opened, the connection flow path 1900 is opened, and thus the pressurizing medium from the first master chamber 1220a of the integrated master cylinder 1200 is supplied to the second pressure chamber 1340 of the hydraulic pressure supply device via the second dump flow path 1820.

The control valve 1901 may be controlled to be closed in a normal braking mode of the electric brake system 1000 and controlled to be opened in a sudden braking mode in which a high hydraulic pressure is quickly generated.

The branch flow path 1910 has one end connected to the first master chamber 1220a of the integrated master cylinder 1200 and the other end connected to the connection flow path 1900. The one end of the branch flow path 1910 may be connected to the first master chamber 1220a of the integrated master cylinder 1200 and connected to the fourth hydraulic port 1280d. The other end of the branch flow path 1910 may be connected to the connection flow path 1900 and connected to a rear end of the control valve 1901 on the connection flow path 1900.

A branch check valve 1911 for allowing only the flow of the pressurizing medium in a direction from the first master chamber 1220a to the second dump flow path 1820 and block the flow of the pressurizing medium in a direction opposite to the above direction may be provided on the branch flow path 1910.

As shown in FIG. 2, at an input side of the controller 2000, the pedal displacement sensor 11 for detecting the displacement of the brake pedal 10, the first pressure sensor PS1 for detecting the hydraulic pressure of the pressurizing medium provided by the hydraulic pressure supply device 1300, a second pressure sensor PS2 for detecting the hydraulic pressure in the second master chamber 1230a, and a stroke sensor 13 for detecting the displacement of the hydraulic piston 1320 are electrically connected.

At an output side of the controller 2000, the control valve 1901, the cut valves 1611 and 1621, the hydraulic pressure supply device 1300, the hydraulic pressure control unit 1400, the hydraulic circuits 1510 and 1520, and the dump valves 1831 and 1841 are electrically connected.

The controller 2000 may be referred to as an ECU. The controller 2000 may include a processor 2100 and a memory 2200.

The memory 2200 may temporarily store detection data received from various sensors and temporarily store a processing result of the detection data of the processor 2100.

The memory 2200 may include non-volatile memories, such as a flash memory, a read only memory (ROM), and an erasable programmable ROM (EPROM), as well as volatile memories such as a static random access memory (SRAM) and a dynamic RAM (DRAM).

The controller 2000 may perform the normal braking mode and the sudden braking mode in which a higher hydraulic pressure than in the normal braking mode is quickly generated.

Figure 3:
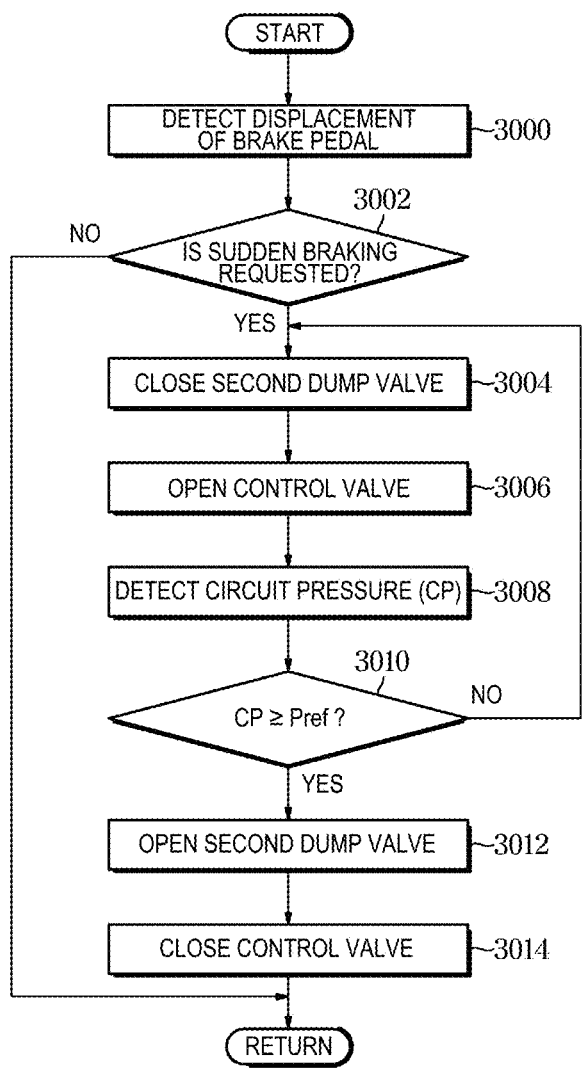
FIG. 3 is a flowchart of a method of controlling the electric brake system according to the first embodiment.

FIG. 3 is a flowchart of a method of controlling the electric brake system according to the first embodiment.

Referring to FIG. 3, the displacement of the brake pedal 10 stepped on by the driver is detected through the pedal displacement sensor 11 while the normal braking mode is performed (3000).

An initial value and a detection value of the displacement of the brake pedal 10 are compared to determine whether the driver requests sudden braking according to the degree of change in the displacement of the brake pedal (3002). As a result of comparing the initial value and the detection value of the displacement of the brake pedal 10, when the initial value is higher than the detection value and a result value of the comparison is higher than a preset value, it may be determined that the driver has requested sudden braking. When the change in the displacement of the brake pedal greatly occurs for a short time, it may be determined that the driver has requested sudden braking.

When the driver does not request sudden braking (No in 3002), the method returns to a preset routine to continuously perform the normal braking mode.

Meanwhile, when the driver has requested sudden braking, the second dump valve 1841 is closed (3004) and the control valve 1901 is opened (3006). As the second dump valve 1841 is closed and the control valve 1901 is opened, the pressurizing medium in the first master chamber 1220a of the integrated master cylinder 1200 is supplied to the second pressure chamber 1340 of the hydraulic pressure supply device 1300 sequentially via the connection flow path 1900 and the second dump flow path 1820. Since the pressurizing medium supplied to the second pressure chamber 1340 is used to push the hydraulic piston 1320 in a forward direction (to the left direction based on FIG. 1), the high hydraulic pressure may be quickly generated in the first pressure chamber 1330 even without increasing the output of the motor 1370 at the beginning of sudden braking.

In this state, a circuit pressure CP, which is a pressure of the first hydraulic circuit 1510, is detected using the first pressure sensor PS1 (3008).

When the circuit pressure CP is not a preset pressure Pref or higher (No in 3010), the method moves to operation mode 3004 to perform the following operation modes.

Meanwhile, when the circuit pressure CP is the preset pressure Pref or higher (Yes in 3010), it is determined that the high hydraulic pressure may no longer be quickly generated only by the driver strongly stepping on the brake pedal 10, and in order to return the second dump valve 1841 and the control valve 1901 to their original states, the second dump valve 1841 is opened (3012), and the control valve 1901 is closed (3014).

Figure 4:
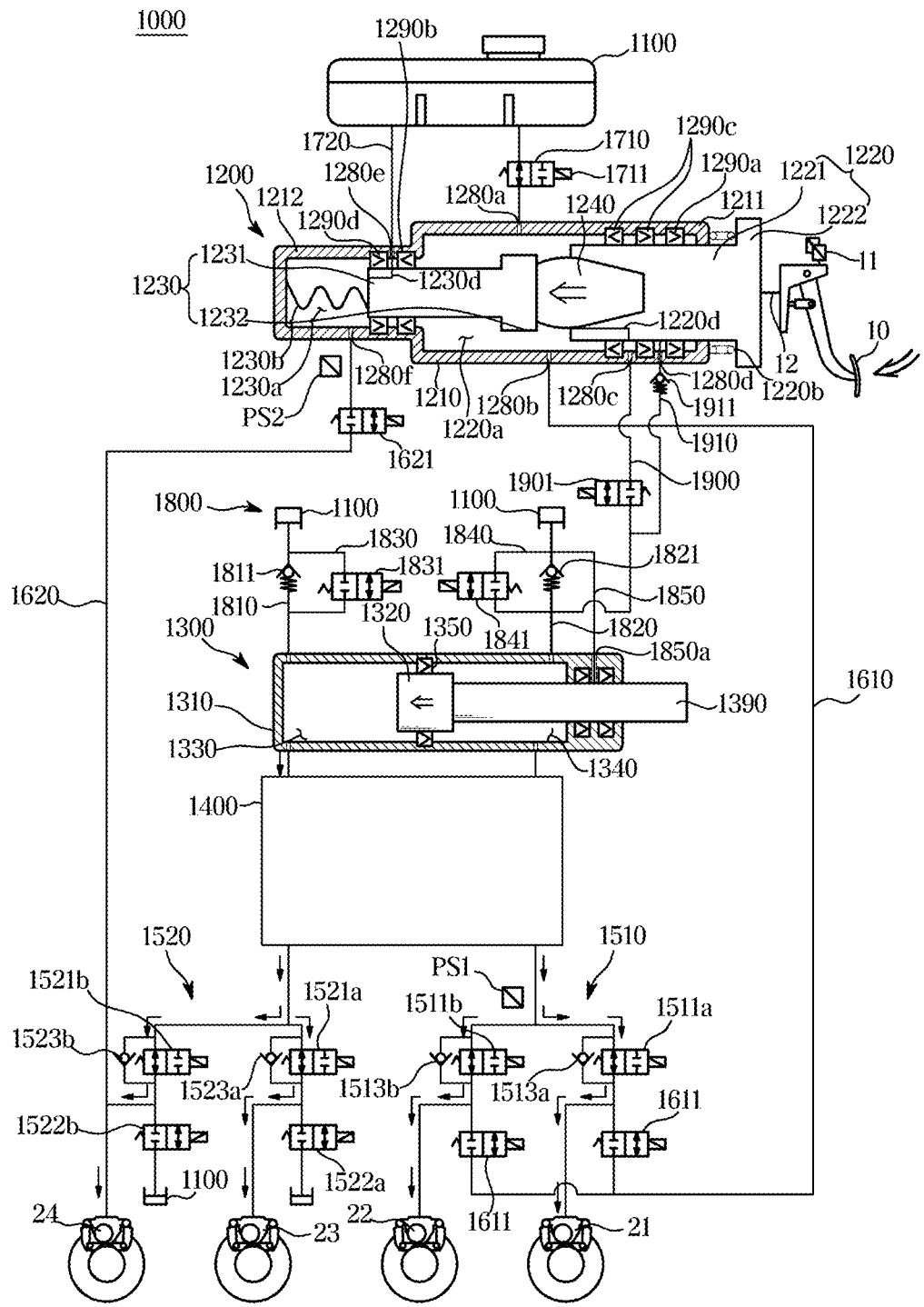
FIG. 4 is a hydraulic circuit diagram showing a state in which a normal braking mode is performed in the electric brake system according to the first embodiment.

FIG. 4 is a hydraulic circuit diagram showing a state in which a normal braking mode is performed in the electric brake system according to the first embodiment.

Referring to FIG. 4, when the driver steps on the brake pedal 10, the normal braking mode starts.

In the normal braking mode, the cut valves 1611 and 1621 and the control valve 1901 are closed, the simulator valve 1711 is opened, and the motor 1670 is driven. At this time, the second dump valve 1841 may be closed.

The rotating force of the motor 1670 is transmitted to the hydraulic pressure provision unit by the power converter, and the hydraulic piston 1320 of the hydraulic pressure provision unit moves forward to generate the hydraulic pressure in the first pressure chamber 1330. The hydraulic pressure discharged from the first pressure chamber 1330 is transmitted to each wheel cylinder 21 to 24 via the hydraulic pressure control unit 1400, the first hydraulic circuit 1510, and the second hydraulic circuit 1520 to generate a braking force.

As the operation of the brake pedal 10 proceeds, the first master piston 1220 moves forward, but as the second cut valve 1621 is closed, the second master chamber 1230a is sealed and thus a displacement of the second master piston 1230 may not occur.

The pressurizing medium accommodated in the first master chamber 1220a, by the closing operation of the first cut valve 1611 and the opening operation of the simulator valve 1711, is introduced along the first reservoir flow path 1710. The second master piston 1230 may not move forward, while the first master piston 1220 may compress the pedal simulator 1240 as it continues to move forward, and the elastic restoring force of the pedal simulator 1240 may be provided to the driver as a pedal feeling.

In addition, as the operation of the brake pedal 10 proceeds, until the first master piston 1220 moves forward beyond a preset level, that is, while the first cutoff hole 1220d and the branch flow path 1910 communicate with each other, the pressurizing medium in the first master chamber 1220a may be supplied to the second pressure chamber 1340 sequentially via the branch flow path 1910, the connection flow path 1900, and the second dump flow path 1820. The supplied pressurizing medium may help to reduce the force of the motor 1670 when the hydraulic pressure is generated at the beginning of braking.

Figure 5:
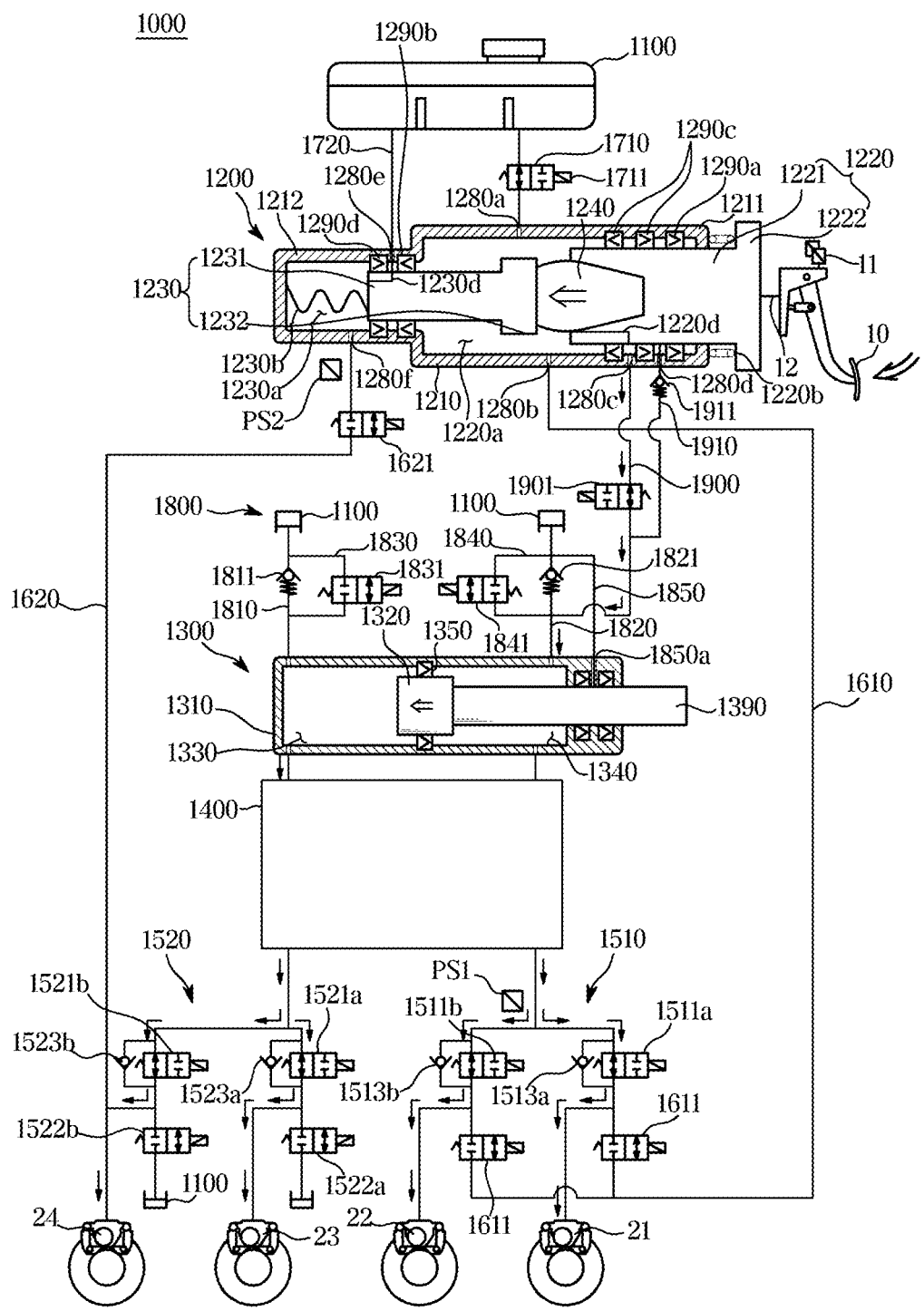
FIG. 5 is a hydraulic circuit diagram showing a state in which a sudden braking mode is performed in the electric brake system according to the first embodiment.

FIG. 5 is a hydraulic circuit diagram showing a state in which a sudden braking mode is performed in the electric brake system according to the first embodiment.

Referring to FIG. 5, when the displacement of the brake pedal 10 is greater than a preset value while the normal braking mode is performed, it is determined that the driver has requested sudden braking, and the sudden braking mode starts.

In the sudden braking mode, the control valve 1901 provided on the connection flow path 1900 is opened.

As the control valve 1901 is opened, the pressurizing medium in the first master chamber 1220a of the integrated master cylinder 1200 is supplied to the second pressure chamber 1340 of the hydraulic pressure supply device 1300 via the connection flow path 1900 and the second dump flow path 1820.

Since the pressurizing medium supplied to the second pressure chamber 1340 is used to push the hydraulic piston 1320 in the forward direction (to the left direction based on FIG. 1), a maximum hydraulic pressure generated in the first pressure chamber 1330 increases. As described above, the high hydraulic pressure may be generated even without increasing the output of the motor 1370 at the beginning of sudden braking. More specifically, the hydraulic pressure is generated in the first pressure chamber 1330 while the hydraulic piston 1320 moves forward. As the hydraulic piston 1320 moves forward in the initial state and a stroke of the hydraulic piston 1320 increases, the hydraulic pressure generated in the first pressure chamber 1330 quickly increases while the amount of the pressurizing medium transmitted to the second pressure chamber 1340 of the hydraulic pressure supply device 1300 from the first master chamber 1220*a* of the integrated master cylinder 1200 increases. Therefore, it is possible to simply and quickly generate the hydraulic pressure required for the requested sudden braking.

The pressurizing medium having the high hydraulic pressure quickly generated in the first pressure chamber 1330 of the hydraulic pressure supply device 1300 may be transmitted to the wheel cylinders 21, 22, 23, and 24 respectively provided on the four wheels via the hydraulic pressure control unit 1400, the first hydraulic circuit 1510, and the second hydraulic circuit 1520 to quickly generate the braking force required for sudden braking at the beginning of sudden braking.

Meanwhile, the controller 2000 may perform the first test mode and a second test mode using the control valve 1901 as an test valve for inspecting leakage of the system. The first test mode is a mode in which a hydraulic pressure value detected by the first pressure sensor PS1 and a hydraulic pressure value detected by the second pressure sensor PS2 are compared to determine whether leakage occurs in the integrated master cylinder 1200 or the simulator valve 1711. The second test mode is a mode to determine whether leakage occurs in the integrated master cylinder 1200 based on detection information of the stroke sensor 13 for detecting the displacement of the hydraulic piston 1320.

The control valve 1901 may be controlled to be closed in the first test mode of the electric brake system 1000 and controlled to be opened in the second test mode of the electric brake system 1000.

Figure 6:
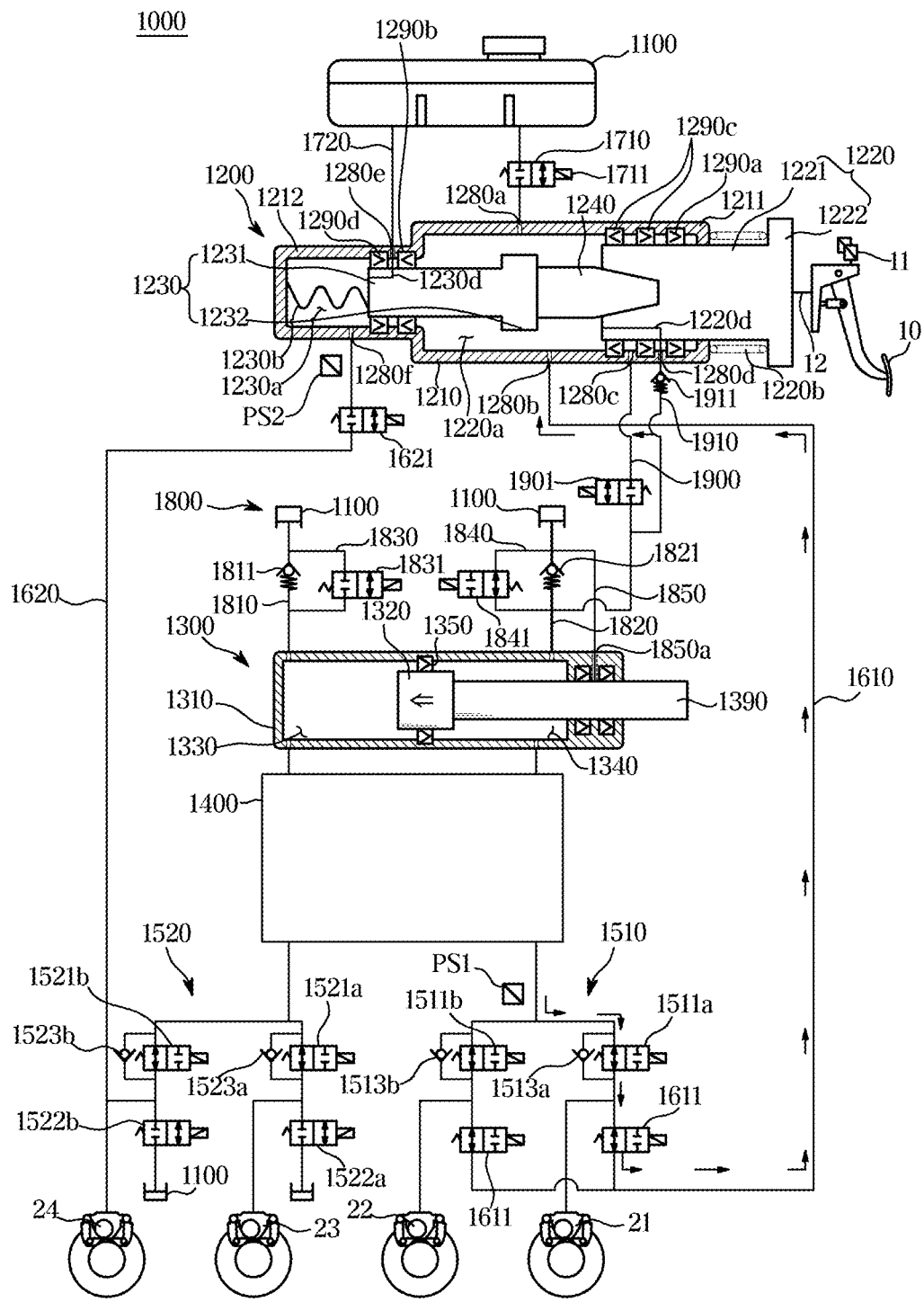
FIG. 6 is a hydraulic circuit diagram showing a state in which a first test mode is performed in the electric brake system according to the first embodiment.

FIG. 6 is a hydraulic circuit diagram showing a state in which the first test mode is performed in the electric brake system according to the first embodiment.

Referring to FIG. 6, the motor 1670 is operated to move the hydraulic piston 1320 forward and generate the hydraulic pressure in the first pressure chamber 1330. At the same time, the simulator valve 1711, the control valve 1901, the third and fourth inlet valves 1521*a* and 1521*b*, and the second cut valve 1621 are closed, and the first and second inlet valves 1511*a* and 1511*b* and the first cut valve 1611 are opened. Therefore, the hydraulic pressure generated in the first pressure chamber 1330 is introduced into the first master chamber 1220*a* sequentially via the hydraulic pressure control unit 1400, the first and second inlet valves 1511*a* and 1511*b* of the first hydraulic circuit 1510, and the first backup flow path 1610. At this time, since the second cut valve 1621 is in the closed state, the second master chamber 1230*a* is sealed.

In this state, the pressure value measured by the first pressure sensor PS1 and the pressure value measured by the second pressure sensor PS2 may be compared to inspect whether leakage occurs in the integrated master cylinder 1200 and the simulator valve 1711. Specifically, when leakage does not occur in the components mounted on the integrated master cylinder 1200 and the simulator valve 1711, the hydraulic pressure value of the hydraulic pressure supply device 1300 measured by the first pressure sensor PS1 may reach a target pressure, and at the same time, the corresponding hydraulic pressure may flow into the first master chamber 1220*a* via the first backup flow path 1610 to pressurize the second master piston 1230 forward, and thus the hydraulic pressure value of the second master chamber 1230*a* detected by the second pressure sensor PS2 and the hydraulic pressure value detected by the first pressure sensor PS1 may be synchronized. When the hydraulic pressure value detected by the first pressure sensor PS1 and the hydraulic pressure value detected by the second pressure sensor PS2 are synchronized for a preset time, this may be determined to be in a normal state to finish the first test mode.

Conversely, when the hydraulic pressure value measured by the second pressure sensor PS2 is lower than the hydraulic pressure value measured by the first pressure sensor PS1, it may be determined that leakage occurs in the integrated master cylinder 1200 and the simulator valve 1711. Specifically, after the hydraulic pressure value of the pressurizing medium pressurized by the hydraulic pressure supply device 1300 measured by the first pressure sensor PS1 reaches the target pressure, the corresponding hydraulic pressure is maintained for a preset time, but when the hydraulic pressure value of the second master chamber 1230*a* detected by the second pressure sensor PS2 is lower than the hydraulic pressure value detected by the first pressure sensor PS1 or when the hydraulic pressure value detected by the first pressure sensor PS1 is also reduced gradually, this may be determined to be in the abnormal state because leakage occurs in the integrated master cylinder 1200 and the simulator valve 1711 and thus the hydraulic pressure in the second master chamber 1230*a* is not reach the target pressure.

As described above, the electric brake system 1000 according to the first embodiment may determine whether various components, specifically, the first sealing member 1290*a*, the second sealing member 1290*b*, the fourth sealing member 1290*d*, the branch check valve 1911, and the like, provided on the integrated master cylinder 1200 are normal through the first test mode and also determine whether the simulator valve 1711 is normal. Furthermore, it may also be determined whether the nearby components connected to the integrated master cylinder 1200, such as the second cut valve 1621, are normal.

As a result of the first test mode, when it is determined that leakage occurs in the components of the integrated master cylinder 1200 or the simulator valve 1711, the electric brake system 1000 may notify the fact that the components of the integrated master cylinder 1200 or the simulator valve 1711 is in the abnormal state of the driver through a display or an alert sound and guide the driver to restrict driving of a vehicle.

When the first test mode is determined to be normal as a result of performing the first test mode, the second test mode may be entered.

Figure 7:
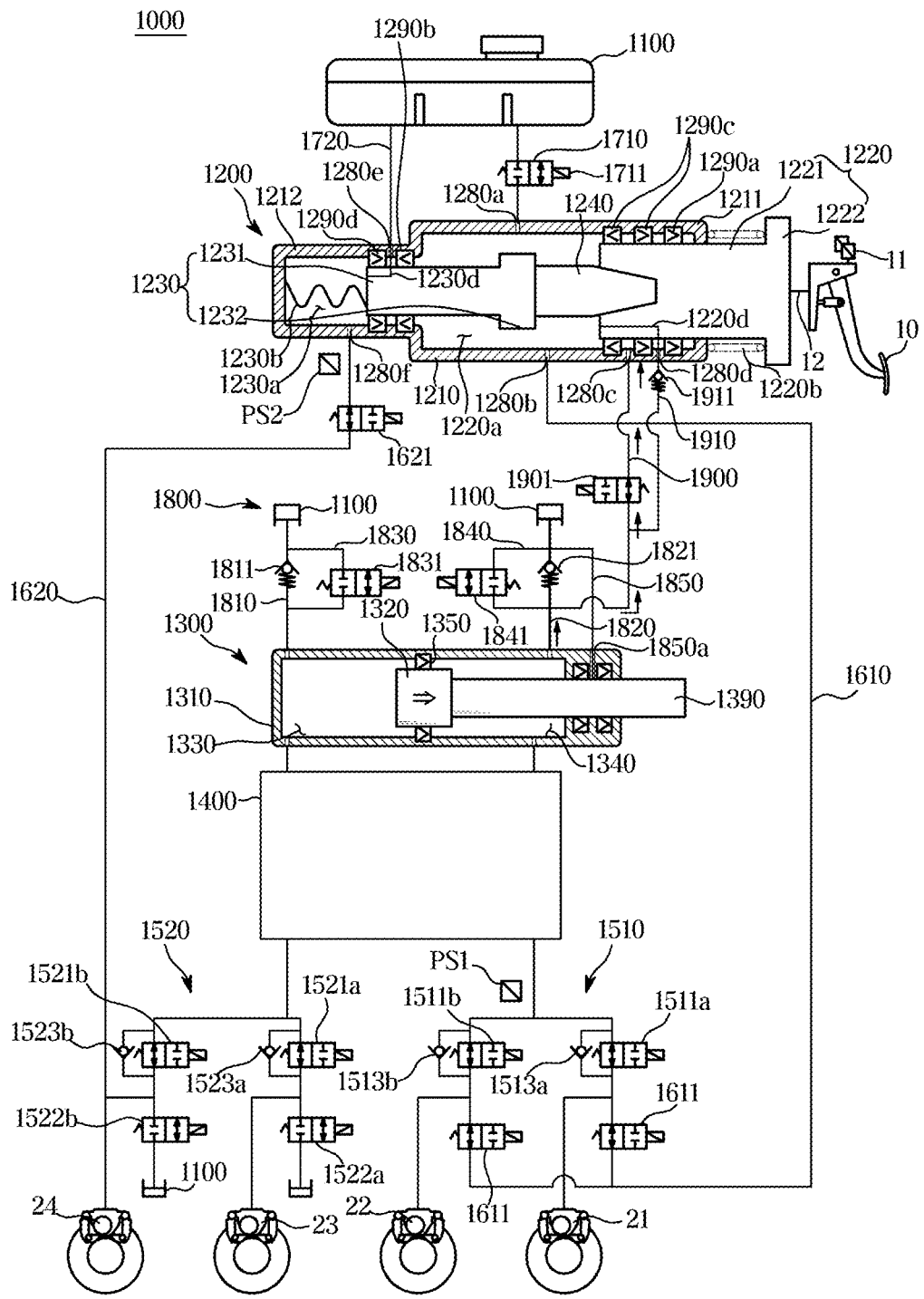
FIG. 7 is a hydraulic circuit diagram showing a state in which a second test mode is in the electric brake system according to the first embodiment.

FIG. 7 is a hydraulic circuit diagram showing a state in which the second test mode is in the electric brake system according to the first embodiment.

Referring to FIG. 7, the motor 1670 is operated to move the hydraulic piston 1320 backward and generate the hydraulic pressure in the second pressure chamber 1340. At the same time, the second dump valve 1841 is closed to block the hydraulic connection between the second pressure chamber 1340 and the reservoir 1100 and allow the hydraulic connection between the second pressure chamber 1340 and the connection flow path 1900, and the control valve 1901 is opened. Therefore, the hydraulic pressure generated in the second pressure chamber 1340 is transmitted to the third hydraulic port 1280c sequentially via the second dump flow path 1820 and the connection flow path 1900.

Since the third sealing member 1290c is provided to block the flow of the pressurizing medium from the connection flow path 1900 toward the first master chamber 1220a, when the third sealing member 1290c corresponds to the normal state, the third hydraulic port 1280c is closed, and thus the hydraulic pressure may no longer be generated in the second pressure chamber 1340 after the hydraulic piston 1320 moves backward as much as a preset displacement.

Therefore, when the displacement of the hydraulic piston measured by the stroke sensor 13 is within a preset range, it may be determined that the third sealing member 1290c is in the normal state to finish the second test mode. Conversely, when the displacement of the hydraulic piston measured by the stroke sensor (not shown) exceeds the preset range or gradually increases, the electric brake system 1000 may determine that the third sealing member 1290c is in the normal state because leakage occurs in the third sealing member 1290c, notify this fact of the driver through the display or the alert sound, and guide the driver to restrict the driving of the vehicle.

Figure 8:
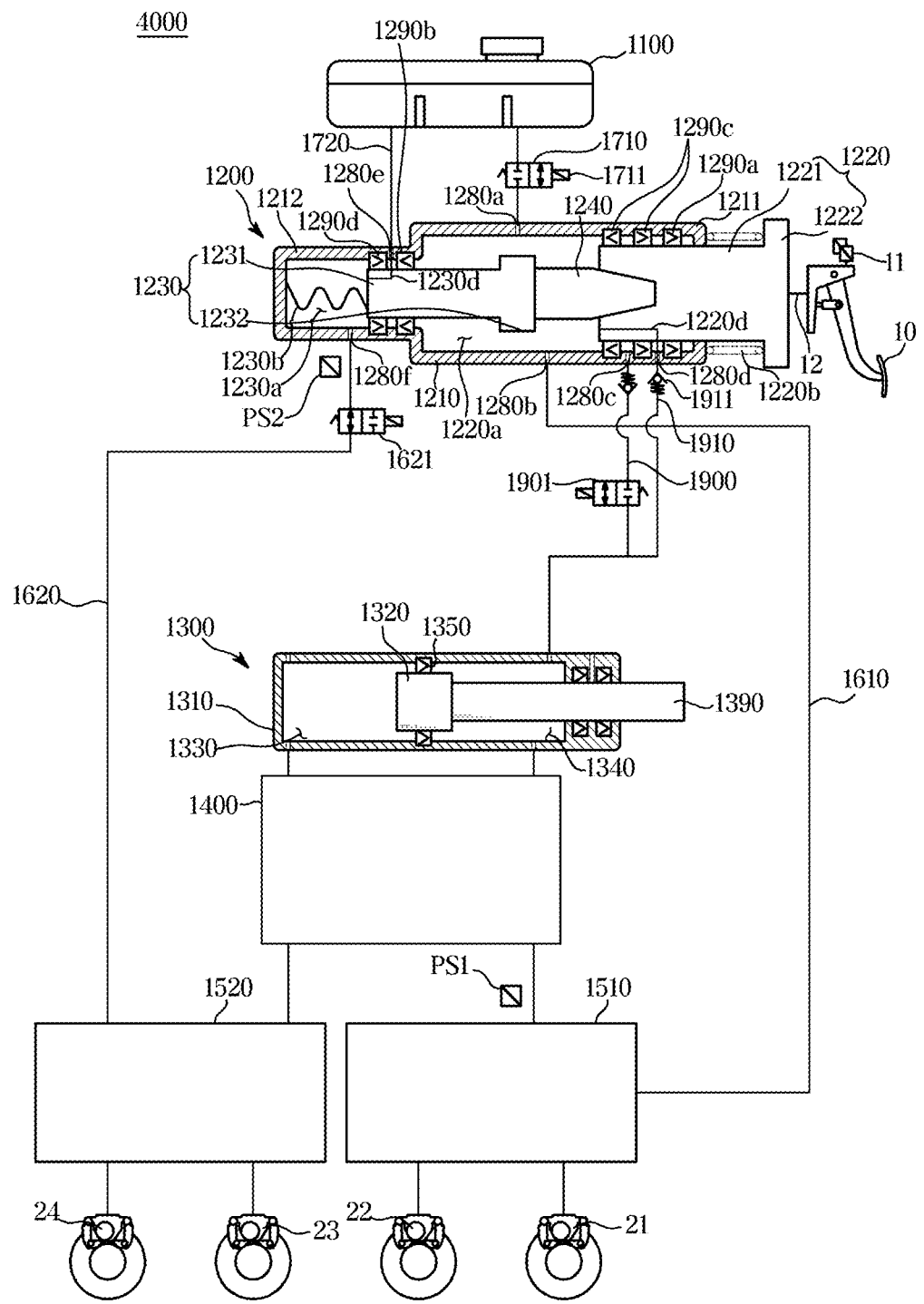
FIG. 8 is a hydraulic circuit diagram showing an electric brake system according to a second embodiment.

FIG. 8 is a hydraulic circuit diagram showing an electric brake system according to a second embodiment.

Referring to FIG. 8, in an electric brake system 4000 according to the second embodiment, the connection flow path 1900 is provided to directly connect the first master chamber 1220a of the integrated master cylinder 1200 and the second pressure chamber 1340 of the hydraulic pressure supply device 1300.

The connection flow path 1900 may have one end connected to the first master chamber 1220a of the integrated master cylinder 1200 and the other end connected to the second pressure chamber 1340 of the hydraulic pressure supply device 1300.

The control valve 1901 for controlling the flow of the pressurizing medium may be provided at one end of the connection flow path 1900.

The control valve 1901 may be controlled to be closed in the normal braking mode of the electric brake system 4000 and controlled to be opened in the sudden braking mode of the electric brake system 4000.

In the sudden braking mode, the control valve 1901 provided on the connection flow path 1900 is opened. The pressurizing medium in the first master chamber 1220a of the integrated master cylinder 1200 is directly supplied to the second pressure chamber 1340 of the hydraulic pressure supply device 1300 through the connection flow path 1900.

Since the pressurizing medium supplied to the second pressure chamber 1340 is used to push the hydraulic piston 1320 in the forward direction (to the left direction based on FIG. 8), a maximum hydraulic pressure generated in the first pressure chamber 1330 increases. As described above, the high hydraulic pressure may be generated even without increasing the output of the motor 1370 at the beginning of sudden braking. More specifically, the hydraulic pressure is generated in the first pressure chamber 1330 while the hydraulic piston 1320 moves forward. As the hydraulic piston 1320 moves forward in the initial state and the stroke of the hydraulic piston 1320 increases, the hydraulic pressure generated in the first pressure chamber 1330 quickly increases while the amount of the pressurizing medium transmitted to the second pressure chamber 1340 of the hydraulic pressure supply device 1300 from the first master chamber 1220a of the integrated master cylinder 1200 increases. Therefore, it is possible to simply and quickly generate the hydraulic pressure required for the requested sudden braking.

The pressurizing medium having the high hydraulic pressure quickly generated in the first pressure chamber 1330 of the hydraulic pressure supply device 1300 may be transmitted to the wheel cylinders 21, 22, 23, and 24 respectively provided on the four wheels via the hydraulic pressure control unit 1400, the first hydraulic circuit 1510, and the second hydraulic circuit 1520 to quickly generate the braking force required for sudden braking at the beginning of sudden braking.

Meanwhile, in the embodiments, the detection of the displacement of the brake pedal 10 using the pedal displacement sensor 11 in order to determine the driver's normal braking intention and sudden braking intention has been described, but the present disclosure is not limited thereto, and it is possible to achieve the same effect even using a displacement sensor for detecting the displacement of the first master piston 1220 as the brake pedal 10 operates.

Meanwhile, the above-described controller and/or the components thereof may include one or more processor/microprocessor(s) coupled to a computer-readable recording medium storing computer-readable code/algorithm/software. The processor(s)/microprocessor(s) may execute the computer-readable code/algorithm/software stored in the computer-readable recording medium to perform the above-described functions, operations, steps, etc.

The above-described controller and/or the components thereof may further include a memory implemented as a computer-readable non-temporary recording medium or a computer-readable temporary recording medium. The memory may be controlled by the above-described controller and/or the components thereof and configured to store data transmitted to or received from the above-described controller and/or the components thereof or configured to store data processed or to be processed by the above-described controller and/or the components thereof.

In the disclosed embodiments, the computer-readable code/algorithm/software may be implemented in the computer-readable recording medium. The computer-readable recording medium may be a computer-readable non-temporary recording medium, such as a data storage device capable of storing data that can be read by the processor/microprocessor. Examples of the computer-readable recording medium include a hard disk drive (HDD), a solid state drive (SSD), a silicon disk drive (SDD), a ROM, a CD-ROM, a magnetic tape, a floppy disk, an optical data storage device, etc.

As is apparent from the above description, according to the present disclosure, it is possible to simply and quickly generate a hydraulic pressure required for sudden braking when a driver requests sudden braking.

In addition, according to the present disclosure, since a high hydraulic pressure is quickly generated and supplied in a method of supplying a pressurizing medium of a master cylinder to a hydraulic chamber of a hydraulic pressure supply device to reduce a rotating force of a motor when sudden braking is performed, it is possible to shorten a braking distance of a vehicle and finally manufacturing a motor product in a small size, thereby saving costs and reducing a current consumed by the product.

What is claimed is:
1. An electric brake system comprising:
a reservoir in which a pressurizing medium is stored;

an integrated master cylinder including a master piston connected to a brake pedal and a master chamber having a volume changed by a displacement of the master piston;

a hydraulic pressure supply device including a first pressure chamber provided in front of a hydraulic piston and a second pressure chamber provided behind the hydraulic piston and configured to move the hydraulic piston forward or backward to generate a hydraulic pressure;

first and second hydraulic circuits configured to control a flow of the pressurizing medium supplied to a wheel cylinder;

a hydraulic pressure control unit configured to control the flow of the pressurizing medium provided from the hydraulic pressure supply device to the first and second hydraulic circuits;

a connection flow path connecting the master chamber and the second pressure chamber;

a control valve provided on the connection flow path to control the flow of the pressurizing medium; and a controller electrically connected to the control valve, wherein, the controller is configured to open the control valve to supply the pressurizing medium from the master chamber to the second pressure chamber in response to a sudden braking request by a driver.

2. The electric brake system of claim 1, wherein the integrated master cylinder includes:

a first master piston connected to the brake pedal, a first master chamber having a volume changed by a displacement of the first master piston, a second master piston provided to be displaced by the displacement of the first master piston, and a second master chamber having a volume changed by a displacement of the second master piston.

3. The electric brake system of claim 2, further comprising:

a dump flow path connecting the second pressure chamber and the reservoir; and a dump valve provided on the dump flow path to control the flow of the pressurizing medium, wherein the connection flow path has one end connected to the dump flow path and the other end connected to the first master chamber, and the control valve is provided at one end of the connection flow path.

4. The electric brake system of claim 3, wherein the controller is configured to close the dump valve to supply the pressurizing medium from the first master chamber to the second pressure chamber.

5. The electric brake system of claim 4, further comprising a pressure sensor configured to detect a circuit pressure of the first hydraulic circuit or the second hydraulic circuit, wherein the controller is configured to close the control valve and open the dump valve, based on a circuit pressure detected through the pressure sensor being higher than a preset pressure.

6. The electric brake system of claim 3, wherein the controller is configured to perform a first test mode and a second test mode in which whether leakage occurs in a simulator valve configured to control the flow of the pressurizing medium between the reservoir and the first master chamber or the integrated master cylinder is inspected.

7. The electric brake system of claim 6, wherein the controller is configured to close the control valve and open the dump valve in the first test mode, and the controller is configured to open the control valve and close the dump valve in the second test mode.

8. The electric brake system of claim 2, wherein the connection flow path directly connects the first master chamber and the second pressure chamber.

9. The electric brake system of claim 1, further comprising a brake pedal sensor configured to detect a displacement of the brake pedal, wherein the controller is configured to opens the control valve based on a displacement of the brake pedal reaching a preset value.

10. A method of controlling an electric brake system including a reservoir in which a pressurizing medium is stored, an integrated master cylinder including a master piston connected to a brake pedal and a master chamber having a volume changed by a displacement of the master piston, a hydraulic pressure supply device including a first pressure chamber provided in front of a hydraulic piston and a second pressure chamber provided behind the hydraulic piston and configured to move the hydraulic piston forward or backward to generate a hydraulic pressure, first and second hydraulic circuits configured to control a flow of the pressurizing medium supplied to a wheel cylinder, a hydraulic pressure control unit configured to control the flow of the pressurizing medium provided from the hydraulic pressure supply device to the first and second hydraulic circuits, a connection flow path connecting the master chamber and the second pressure chamber, and a control valve provided on the connection flow path to control the flow of the pressurizing medium, the method comprising opening the control valve to supply the pressurizing medium from the master chamber to the second pressure chamber in response to a sudden braking request by a driver.

11. The method of claim 10, wherein the integrated master cylinder includes:

a first master piston connected to the brake pedal, a first master chamber having a volume changed by a displacement of the first master piston, a second master piston provided to be displaced by the displacement of the first master piston, and a second master chamber having a volume changed by a displacement of the second master piston.

12. The method of claim 11, wherein the electric brake system further includes:

a dump flow path connecting the second pressure chamber and the reservoir; and a dump valve provided on the dump flow path to control the flow of the pressurizing medium, the connection flow path has one end connected to the dump flow path and the other end connected to the first master chamber, and the control valve is provided at one end of the connection flow path.

13. The method of claim 12, wherein the opening of the control valve comprises closing the dump valve to supply the pressurizing medium from the first master chamber to the second pressure chamber.

14. The method of claim 13, further comprising, after the opening of the control valve, closing the control and opening the dump valve, based on a circuit pressure detected through a pressure sensor configured to detect a circuit pressure of the first hydraulic circuit or the second hydraulic circuit being higher than a preset pressure.

15. The method of claim 12, further comprising performing a first test mode and a second test mode in which whether leakage occurs in a simulator valve configured to control the flow of the pressurizing medium between the reservoir and the first master chamber or the integrated master cylinder is inspected.

16. The method of claim 15, wherein the performing of the first test mode comprises closing the control valve and opening the dump valve, and the performing of the second test mode comprises opening the control valve and closing the dump valve.

17. The method of claim 12, wherein the opening of the control valve comprises opening the control valve based on a displacement of the brake pedal reaching a preset value.

* * * * *